United States Patent [19]

Heinz et al.

[11] Patent Number: 5,128,401
[45] Date of Patent: Jul. 7, 1992

[54] POLYAMIDE MOLDING COMPOUNDS

[75] Inventors: Hans-Detlef Heinz, Krefeld; Aziz El-Sayed, Leverkusen; Werner Klöker; Ralf Dujardin, both of Krefeld, all of Fed. Rep. of Germany

[73] Assignee: Bayer Aktiengesellschaft, Leverkusen, Fed. Rep. of Germany

[21] Appl. No.: 642,877

[22] Filed: Jan. 18, 1991

[30] Foreign Application Priority Data

Jan. 30, 1990 [DE] Fed. Rep. of Germany ....... 4002605

[51] Int. Cl.⁵ .................. C08K 5/13; C08L 77/02; C08L 81/00
[52] U.S. Cl. .................. 524/342; 524/343; 524/538; 524/540; 524/609; 524/611; 525/420; 525/537
[58] Field of Search ............... 524/342, 343, 538, 540, 524/609, 611; 525/420, 537

[56] References Cited

U.S. PATENT DOCUMENTS

| | | | |
|---|---|---|---|
| 4,292,416 | 9/1981 | Shue et al. | 525/420 |
| 4,760,109 | 7/1988 | Chiba | 524/606 |
| 4,849,474 | 7/1989 | Galluci | 524/133 |

Primary Examiner—Paul R. Michl
Assistant Examiner—Peter Szekely
Attorney, Agent, or Firm—Connolly & Hutz

[57] ABSTRACT

A polymeric molding compositon based on aliphatic polyamides contains as additives polyarylene sulfides and polyphenolic compounds free from tertiary alkyl group ortho to the phenolic-OH groups is useful in producing molded articles such as films, fibers and shaped objects.

13 Claims, No Drawings

POLYAMIDE MOLDING COMPOUNDS

This invention relates to polyamide molding compounds based on aliphatic polyamides which are distinguished by very good properties. The polyamide molding compounds according to the invention are characterized in that comparatively small quantities of polyarylene sulfides B) and selected polyphenolic compounds C) are present in addition to the polyamides (A).

The invention also relates to a process for the production of the polyamide molding compounds according to the invention and to the use of the molding compounds according to the invention for the production of moldings, films, fibers, semifinished products, composite materials and other articles.

Polyamides are a class of polymers which have been successfully used for many years for a number of practical applications. They may be produced by various processes, may be synthesized from a variety of polyamide-forming components and, depending on the particular application, may be processed either individually or even in combination with processing aids, polymeric blending components or even mineral reinforcing materials (such as fillers or glass fibers for example) to form materials having specially adjusted combinations of properties. Thus, polyamides are industrially used in large quantities for the production of fibers, plastic moldings and films and also, for example, as hotmelt adhesives and auxiliaries in a number of applications.

One disadvantage of polyamides as a class of materials is their high water absorption attributable to the polarity and hydrophilicity of the amide groups. Although the water which acts as a plasticizer increases the ductility of the material, it reduces rigidity and strength to a considerable extent. Accordingly, water absorption is a limiting factor to the wider use of polyamides in certain applications.

Methods for significantly reducing the water absorption of polyamides and improving other properties, such as flow, surface quality and UV stability, at the same time are described, for example, in applicants' own patent applications DOS 3 248 329, EP 0 240 887 and DOS 3 610 595. In these processes, phenolic compounds are added to the polyamides as additives. The resulting molding compounds have very good properties and may advantageously be used, for example, for any applications requiring increased dimensional stability.

Phenol-containing polyamides are also described, for example, in UDSSR 687 088 and in V. N. Stepanov, A. A. Speranskii, L. S. Gerasimova, G. V. Khutareva, Khim. Volokna 1978 (6), 51; V. N. Stepanov, A. V. Dolgov, A. A. Speranskii, Khim, Volokna 1977 (4), 31; V. N. Stepanov, V. F. Lednik, A. I. Lubnina, A. A. Speranskii, Khim. Volokna 1975 (4), 32; S. I. Shkusenko, V. M. Kharitonov, B. A. Khar'kov et al, Khim. Volokna 1983 (5), 25. Many of the compounds described in the above-cited patent applications or articles were subsequently mentioned once more in JA 60/051 744, 60/051 745 and WO 88/06169.

The use of polyphenol-containing polyamide compounds for the production of reinforced semifinished products/composite materials, for example by pultrusion or film stacking, is described in applicants' own hitherto unpublished patent application P 39 34 710.9 (Le A 27 095).

However, the relatively high concentration of phenolic OH groups can lead to discoloration, for example during processing, during accelerated conditioning with hot water or even at elevated in-use temperatures. Accordingly, it would be desirable to produce polyamide compounds combining reduced water absorption with improved color or rather color stability. In addition, it would be desirable further to improve mechanical properties and to increase the solidification rate during cooling and heat resistance.

It has now surprisingly been found that the color or rather color stability of phenol-containing polyamides can be improved by addition of relatively small quantities of polymeric additives (polyarylene sulfides) containing the predominant structural element (I)

(I)

in which Ar is an optionally substituted arylene radical, preferably a p-phenylene radical (polyphenylene sulfide). At the same time, other desired property changes are obtained.

Accordingly, the present invention relates to polyamide molding compounds containing A) at least 50% by weight aliphatic polyamides,
B) 0.1 to about 40% by weight polymeric additives containing the predominant structural element (I)

(I)

in which Ar is an optionally substituted arylene radical, preferably a phenylene radical,
C) 1 to 25% by weight bis- or polyphenols in which there should be no tertiary alkyl groups in the ortho position to the OH groups and, optionally,
D) up to 150% by weight, based on the sum of A)–C), of other standard additives.

The present invention also relates to a process for the production of the molding compounds according to the invention by mixing the components in the melt and to their use for the production of moldings, films, fibers, semi-finished products, composite materials and other articles.

The polymeric additives B) containing the predominant structural element (I) are arylene sulfide homopolymers and/or copolymers in which the co-structure component should be ≦50 mol-%.

One example of a suitable arylene radical —Ar— in formula (I) is the p-phenylene radical (II)

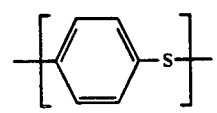
(II)

which is also the preferred radical —Ar—.

Accordingly, preferred additives B) are partly crystalline homo- and/or copolymers (polyarylene sulfides) containing the predominant structural element (III)

In a particularly preferred embodiment, the homopolymer of the element (III), poly-p-phenylene sulfide (PPS), is used.

Suitable comonomers for the production of (co)polyarylene sulfides are, for example, (IV) and (V):

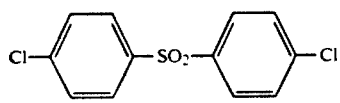
(IV)

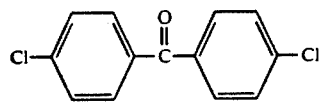
(V)

They give copolyarylene sulfides containing, for example, —SO$_2$— and/or

—C groups.

The polymeric additives B) to be used in accordance with the invention are known substances or may be produced by methods known in principle.

It is preferred to use arylene sulfide polymers which have been directly condensed in solution to high molecular weights in a single step, i.e. without any subsequent oxidative increase in molecular weight. Processes for their production are known, cf. for example EP 0 171 021. Corresponding polyarylene sulfides are commercially available, for example, under the names ®Tedur or ®Fortron.

Suitable polymers B) are polymers having melt viscosities (at 320° C. and 1,000 s$^{-1}$) of approximately 5 to approximately 500 Pa.s, preferably from 10 to 200 Pa.s and more preferably from 10 to 150 Pa.s. They may be used in the form of granulate or in powder form or in any form.

Preferred bis- or polyphenols C) have the general formula (VI)

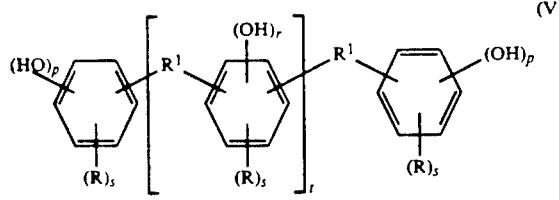
(VI)

in which
the R's independently of one another represent hydrogen (H), C$_{1-20}$(ar)alkyl (preferably methyl), C$_{6-18}$(alk)aryloxy or C$_{1-20}$(ar)alkyloxy and C$_{6-18}$(alk)aryloxy groups,
the R$^1$'s independently of one another represent a chemical bond, a C$_{1-20}$ alkylene or (optionally cyclic) alkylidene group, an ester group, an amide group, —O—, —SO—, —SO$_2$—, —S—, —CO—, —P—, P=O or even a fusion of two or more rings,
p is 1 or 2, more preferably 1,
r is 0, 1 or 2, preferably 1,
s is 0, 1 or 2, preferably 0 or 1,
t is a number of 0 to 15 (average value) and preferably 0 to 12, most preferably 0 to 10,
no group in the ortho position to an OH group should be a tertiary alkyl group.

Preferred compounds of formula (VI) are 2,2-(bis-4-hydroxyphenyl)-propane (bisphenol A), bis-4-hydroxyphenyl methane (bisphenol F), 1,1-(bis-4-hydroxyphenyl)-cyclohexane (bisphenol Z), 2,2-bis-(4-hydroxy-3,5-dimethylphenyl)-propane, 1,1-bis-(4-hydroxyphenyl)-3,3,5-trimethyl cyclohexane, 4,4'-dihydroxydiphenyl sulfone and also phenol- or alkylphenol-formaldehyde condensates (novolaks).

Particularly preferred novolaks correspond to formula (VII)

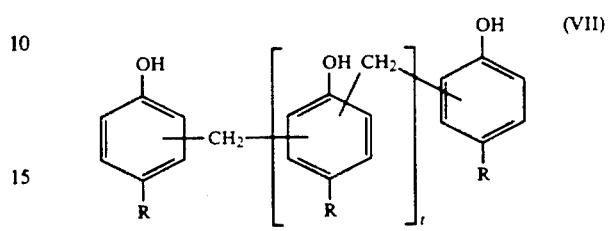
(VII)

in which R is hydrogen or C$_{1-5}$ alkyl or phenyl, more particularly hydrogen, and t is an integer of 1 to 10 (average value), so that their molecular weight ($\overline{M}$) is between about 300 and about 1,500 g/mol$^{-1}$.

The phenolic components C) of the mixture may be used individually or in admixture. Mixtures of isomers and crude reaction products may also be used.

The phenolic components C) of the mixture are known in principle or may be produced by methods known in principle.

In general, the bis- or polyphenols C) are preferably used in quantities of 2 to 20% by weight and more preferably in quantities of 5 to 15% by weight. In special cases, for example for pultrusion or for the production of other composite materials, quantities of up to 25% by weight may be preferred and quantities of up to 20% by weight particularly preferred.

In general, the polymeric additives B) are preferably used in quantities of 0.4 to 20% by weight and more preferably in quantities of from 0.5 to 10% by weight. In special cases, for example when particular flame resistance is required, the preferred maximum quantity is 20% by weight and, more particularly, 15% by weight.

The sum of B) plus C) should be at most 50% by weight, based on (A+B+C). Where one component is present in a large quantity, the quantity of the other component should be limited accordingly.

Examples of preferred polyamides A) are PA 6, 66, 610, 69, 46, 11, 12, 1212, 6/66 copolyamides, copolyamides based on terephthalic acid, hexamethylenediamine and caprolactam or adipic acid and other copolyamides based on PA 6 or 66.

Pa 6, 66 and mixtures of, or copolyamides based on, PA 6 and 66 are particularly preferred.

Suitable additives D) are, for example, fillers or reinforcing materials (glass fibers, glass beads, carbon fibers, aramide fibers, TiO$_2$, mineral fillers, etc.), UV stabilizers, light stabilizers, antioxidants, polymeric blending components, pigments, dyes, nucleating agents, crystallization accelerators and retarders, flow aids, lubricants, mold release agents, flameproofing agents, etc., of the type described in the prior art.

Suitable polymeric blending components are, for example, diene rubbers, acrylate rubbers, polyethylenes, polypropylenes, ethylene/propylene copolymers, ethylene/1-butene copolymers, ethylene/propylene/diene terpolymers, ethylene/acrylic acid/acrylate terpolymers, ethylene/vinyl acetate copolymers, polyoctenylenes, polystyrenes, (α-methyl) styrene/(meth-)acrylonitrile copolymers, (meth)acrylonitrile/-butadiene/(α-methyl)-styrene polymers (ABS), high-impact polystyrenes, polycarbonates, aromatic polyester(carbonates), polyesters, such as polyethylene terephthalate for example, polysulfones, polyphenylene oxides, polyether ketones, polyether ether ketones, polyamide imides, polyether sulfones, polyether imides, polyester imides and polyimides, which are known from the prior art as blending components or modifiers.

If necessary, the polymeric blending components should be chemically modified, optionally at least partly, in such a way that the two phases may be partly coupled. Possibilities in this regard are described in and known in principle from the prior art (for example via carboxylic acid or carboxylic anhydride groups or carboxylic acid (t-alkyl) esters of amino groups).

Amorphous polyamides compatible and/or incompatible with the polyamides to be used in accordance with the invention may also be used as additives. For example, polyamides of isophthalic acid, terephthalic acid, hexamethylenediamine and, optionally, 4,4'-diaminodicyclohexyl methane or isophthalic acid and hexamethylenediamine may be used.

Preferred blending components are those of the type typically used for increasing low-temperature and/or dry impact strength (impact modifiers).

The additives D) are present in the mixtures in quantities of up to 150% and preferably in quantities of 0.01 to 100%, based on A)-C).

The polyamide molding compounds according to the invention are produced, optionally in several steps, by mixing the components in the melt, preferably in kneaders or extruders. Any of the typical methods for mixing thermoplastics may be used. The additives B)-D) may be used in the form of the pure substances or as concentrates.

The mixtures according to the invention may be processed by various methods, including for example injection molding, extrusion, pultrusion, film stacking, etc., to form moldings, films, fibers, reinforced semifinished products, composites, etc. These are also the subject of the present invention.

Filling levels of 20 to 90% by weight, preferably 30 to 85% by weight and more preferably 40 to 85% by weight of typical reinforcing materials (for example endless fibers, mats, nonwovens, rovings, for example based on glass fibers, carbon fibers, aramide fibers, PAN fibers, metal fibers, etc.), of the type described in the prior art for composites, are suitable for the production of reinforced semifinished products/composites.

Further particulars, in this regard can be found in applicants' own hitherto unpublished patent application P 39 34 710.9.

Polyamide compounds containing polyarylene sulfides are described, for example, in U.S. Pat. No. 4,292,416. However, there is no reference in this publication to the use of combinations of bis- or polyphenols and polyarylene sulfides. In addition, the cited publication does not make any reference to a color-improving effect of polyarylene sulfides in polyamides.

PA 46 compounds containing polyarylene sulfide are described in WO 86/03212. The foregoing observations also apply to this application.

The polyamides produced in accordance with applicants' own hitherto unpublished patent application P 39 14 715.0 (Le A 26 894) in the presence of, for example, polyphenylene sulfide B) may also be used as the polyamides A).

The mixtures A)-D) according to the invention combine the advantages of phenol modification, namely reduced water absorption and water absorption rate, increased dimensional stability and, optionally, improved flow, surface quality, etc., with an improved color or color stability attributable to the stabilizer B). This is reflected in the fact that, depending on the additive C), the mixtures A)-D) have a lighter (whiter color, for example after compounding and processing, than mixtures which do not contain component B). However, the color-stabilizing effect may eventually become apparent during storage in hot water (accelerated conditioning) or at an elevated in-use temperature, depending on the additive C). This color-stabilizing or color-improving effect of the combination according to the invention was unexpected and could not be derived from the prior art.

In addition, the additives B) in the molding compounds according to the invention may produce a further improved surface and also increased rigidity, strength and heat resistance. Solidification behavior during cooling and flow are also improved in many cases.

Accordingly, they represent a valuable addition to the state of the art.

The following Examples are intended to illustrate the invention without limiting it in way. More particularly, the individual Examples also characterize ranges or groups of substances to be formed therefrom.

EXAMPLES

EXAMPLES 1 to 3

Using a ZSK 53 twin-screw extruder, polyamide 6 ($\eta_{rel}\cong3.5$; m-cresol, 25° C., 1% solution) granules were compounded once with 10% by weight (based on the mixture) of a phenolformaldehyde novolak (phenol: $CH_2O\cong1:0.78$), once with 10% of the same novolak plus 1% by weight of a poly-p-phenylene sulfide having a melt viscosity of 39 Pa.s (310° C. and at a shear rate of 1,000 $s^{-1}$) and once without additives. The strands were cooled in a water bath, granulated and dried.

The visual color evaluation of the strand and YI values obtained from color sample plates are shown in Table 1.

TABLE 1

| Example | Novolak [%] | PPS [%] | T[1] [°C.] | Color | YI value |
|---------|-------------|---------|------------|-------|----------|
| 1 | — | — | 260 | White | −7.8 |
| 2 | 10 | — | 260 | Yellow | 55 |
| 3 | 10 | 1 | 280 | Light yellow | 31 |

[1]Compounding temperature

EXAMPLES 4 to 7

PA 6 ($\eta_{rel}\cong3.5$) was compounded with 10% (based on compound) bisphenol A or with 10% bisphenol A and 0.5, 1.0 and 2.0% by weight (based on compound) PPS having a melt viscosity of 39 Pa.s at 310° C./1,000 $s^{-1}$, in a ZSK 53 twin extruder.

80×10×4 mm small test specimens were then made by injection molding and visually evaluated for color (Table 2).

EXAMPLES 8 to 11

The small test specimens of Examples 4 to 7 were stored in water for 100 h at 70° C. and then visually evaluated for color (Table 2). The water absorption values are also shown in Table 2.

TABLE 2

| Example | Bisphenol A [%] | PPS [%] | T[1] [°C.] | Storage in H₂O | Color | H₂O absorption[2] (%) |
|---|---|---|---|---|---|---|
| PA 6 | — | — | 260 | — | White | 9.4 |
| 4 | 10 | — | " | — | Yellowish | — |
| 5 | " | 0.5 | 280 | — | Light yellow | — |
| 6 | " | 1.0 | " | — | White | — |
| 7 | " | 2.0 | " | — | White | — |
| 8 | 10 | — | — | 100 h/70° C. | Brownish | 6.45 |
| 9 | " | 0.5 | — | " | Light brown | 6.5 |
| 10 | " | 1.0 | — | " | Pale beige | 6.3 |
| 11 | " | 2.0 | — | " | Pale beige | 5.9 |

[1] Compounding temperature
[2] 70° C./100 h

EXAMPLES 12 to 15

Isothermal crystallization times $t_K$ (see Table 3) and also melting points ($T_s$) and heats of fusion ($\nabla H_c$) (Table 4) of the test specimens of Examples 4, 6 and 7 and of pure PA with no additives were determined by differential scanning calorimetry (DSC).

EXAMPLE 16-22

Pa 6 ($\eta_{rel}$=3.5) was compounded with 10% of the novolak of Examples 1 to 3 and various quantities of PPS (76 Pa.s; 306° C./1,000 s⁻¹) in the same way as described in Examples 1 to 3. The color of the extruded strand was visually evaluated (Table 5).

TABLE 3

| Example | Bisphenol A [%] | PPS [%] | $t_K$ [mins] at T [°C.] 195 | 200 | 205 |
|---|---|---|---|---|---|
| 12 | — | — | 1.6 | 4.5 | 16.2 |
| 13 | 10 | — | 4.9 | 17.1 | >30 |
| 14 | 10 | 1 | 2.1 | 8.7 | >30 |
| 15 | 10 | 2 | 2.6 | 13.5 | >30 |

TABLE 4

| Example | Bisphenol A [%] | PPS [%] | $T_s$ [°C.] | $\Delta H_s$ [J/g] |
|---|---|---|---|---|
| 12 | — | — | 220.6 | 61.3 |
| 13 | 10 | — | 215.2 | 59.5 |
| 14 | 10 | 1 | — | — |
| 15 | 10 | 2 | 213.8 | 55.1 |

It can be seen that the crystallization rate is distinctly increased by the addition of PPS (B) without any increase in the heat of fusion, i.e. the phenomenon in question is surprisingly not a nucleation phenomenon.

TABLE 5

| Example | Novolak [%] | PPS [%] | T[1] [°C.] | Color |
|---|---|---|---|---|
| 16 | — | — | 260 | White |
| 17 | 10 | — | " | Yellow |
| 18 | " | 1 | 280 | Light yellow |
| 19 | " | 2 | " | Pale yellow |
| 20 | " | 5 | " | Almost white |
| 21 | " | 10 | " | " |
| 22 | " | 20 | " | " |

The Examples show that the color (color stability) of phenol-containing molding compounds can be distinctly improved by the addition of PPS in accordance with the invention and that crystallization behavior can also be improved. In addition, the water absorption of the phenol-containing polyamide compounds can be even further reduced in some cases.

We claim:

1. Polyamide molding composition which contains
   A) aliphatic polyamides comprising polyamide 6, polyamide 66 or a copolyamide based on polyamides 6 and 66,
   B) 0.4 to 5% by weight polyarylene sulfide, and
   C) 1 to 25% by weight bis- or poly-phenols free from tertiary alkyl groups ortho to phenolic —OH groups.

2. The molding composition claimed in claim 1 wherein the polyarylene sulfide B) is poly-p-phenylene sulfide having a melt viscosity at 320° C./1,000 s⁻¹ in the range of about 5 to 500 Pa.s.

3. The molding composition claimed in claim 1 wherein the polyarylene sulfide B) has a melt viscosity of from 10 to 150 Pa.s at 320° C./1,000 s⁻¹.

4. The molding composition claimed in claim 1 wherein the polyarylene sulfide B) has a melt viscosity of from 10 to 100 Pa.s at 320° C./1,000 s⁻¹.

5. The molding composition claimed in claim 1 wherein the amount of polyarylene sulfide B) is 0.5⁻ to 2% by weight.

6. The molding composition claimed in claim 1 wherein the bisphenol or polyphenol C) corresponds to formula $$(HO)_p \underset{(R)_s}{\underset{|}{\diagdown}}\!\!\!\!\diagup\!\!\!\!\diagdown\!\!\!\!\diagup R^1 \left[ \underset{(R)_s}{\underset{|}{\diagdown}}\!\!\!\!\diagup\!\!\!\!\diagdown\!\!\!\!\diagup \overset{(OH)_r}{} R^1 \right]_t \underset{(R)_s}{\underset{|}{\diagdown}}\!\!\!\!\diagup\!\!\!\!\diagdown\!\!\!\!\diagup (OH)_p$$

in which
the R's independently of one another represent hydrogen, $C_{1-20}$(ar)alkyl, $C_{6-18}$(alk)aryl, $C_{1-20}$(ar)alkyloxy or $C_{6-18}$(alk)aryloxy,
the $R^1$'s independently of one another represent a single bond, $C_{1-20}$ alkylene, or acyclic alkylidene, an ester group, an amide group, —O—, —SO—, —SO₂—, —S—, —CO—, —P—, P=O or a fusion of two or more rings,
p is 1 or 2,
r is 0, 1 or 2,
s is 0, 1 or 2,
t is an average of 0 to 15, wherein no group in the ortho position to an OH group is tertiary alkyl.

7. The molding composition claimed in claim 1 wherein the bis- or polyphenol C) is 2,2-(bis-4-hydroxyphenyl)-propane (bis-phenol A), bis-4-hydroxyphenyl methane (bisphenol F), 1,1-(bis-4-hydroxyphenyl)-cyclohexane (bisphenol Z), 2,2-bis-(4-hydroxy-3,5-dimethylphenyl)-propane,1,1-bis-(4-hydroxyphenyl)-3,3,5-trimethyl cyclohexane,4,4'-dihydroxydiphenyl sulfone or novolaks corresponding to the formula

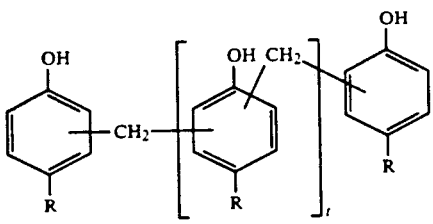

in which R is hydrogen or $C_{1-5}$ alkyl or phenyl and t is an average value integer of 1 to 10, and having a molecular weight (Mn) in the range from about 300 to 1,500.

8. The molding composition claimed in claim 1 wherein the amount of C) is 2 to 20% by weight.

9. The molding composition claimed in claim 1 wherein the amount of C) is 5 to 15% by weight.

10. The molding composition claimed in claim 1 which further contains additives which comprise glass fibers, glass beads, carbon fibers, aramide fibers, $TiO_2$, mineral fillers, UV stabilizers, antioxidants, polymeric blending components, pigments, dyes, nucleating agents, crystallization accelerators and retarders, flow aids, lubricants, mold release agents or flameproofing agents.

11. A process for the production of the molding composition claimed in claim 1 which comprises melt mixing polyamide, polyarylene sulfide and bis- or polyphenols in one or more steps.

12. Molded articles comprising films, fibers, semifinished products, composites and shaped articles which comprise the molding composition claimed in claim 1.

13. A process for production of the molded articles claimed in claim 12 which comprises subjecting the molding composition to injection molding, extrusion, pultrusion or film stacking.

* * * * *